July 5, 1960     T. R. WHITNEY ET AL     2,944,151

INFRARED LANDING SYSTEM FOR AIRCRAFT

Filed Feb. 1, 1955     4 Sheets-Sheet 1

INVENTORS.
THEODORE R. WHITNEY
AVARD F. FAIRBANKS
BY
ATTORNEY

AIMING LEFT

AIMING HIGH

AIMING RIGHT

FLYING TOO FAR LEFT

ON PATH

FLYING TOO FAR RIGHT

FLYING HIGH

AIMING LOW

FLYING LOW

*INVENTORS.*
THEODORE R. WHITNEY
BY AVARD F. FAIRBANKS

ATTORNEY

July 5, 1960　　T. R. WHITNEY ET AL　　2,944,151
INFRARED LANDING SYSTEM FOR AIRCRAFT Filed Feb. 1, 1955　　4 Sheets-Sheet 3

INVENTORS.
THEODORE R. WHITNEY
AVARD F. FAIRBANKS
BY

William R Lane
ATTORNEY

July 5, 1960

T. R. WHITNEY ET AL 2,944,151

INFRARED LANDING SYSTEM FOR AIRCRAFT

Filed Feb. 1, 1955

INVENTORS.
THEODORE R. WHITNEY
AVARD F. FAIRBANKS
BY

ATTORNEY

United States Patent Office 2,944,151
Patented July 5, 1960

2,944,151

INFRARED LANDING SYSTEM FOR AIRCRAFT

Theodore R. Whitney, Whittier, and Avard J. Fairbanks, South San Gabriel, Calif., assignors to North American Aviation, Inc.

Filed Feb. 1, 1955, Ser. No. 485,381

5 Claims. (Cl. 250—83.3)

This invention pertains to a landing system for aircraft utilizing thermal or infrared radiation and, particularly, it pertains to an infrared landing system which indicates to the pilot sufficient information to enable him to land an aircraft safely.

This invention relates to a co-pending application Serial No. 485,369, filed February 1, 1955, now Patent No. 2,882,416, by applicants for an Infrared Scanning System.

Those invisible radiations classed as thermal, or infrared, lie between the shortwave radio region and the visible region of the electromagnetic spectrum. Radiation of this wave length would enable maintaining an airport in complete blackout, yet would afford beacons to allow safe landing of aircraft. In addition, infrared-sensitive devices provide a high degree of angular resolution, furnishing accurate information as to runway approach bearings. A number of infrared radiating beacons are located to delineate a runway strip and are directed so that several beacons may be viewed on an indicator in the aircraft by the pilot, providing him several elements of information, such as correct aim, correct altitude, correct lateral position and distance to the runway.

It is therefore an object of this invention to provide an infrared landing system for aircraft.

It is another object of this invention to provide an invisible, high resolution beacon for landing aircraft.

It is another object of this invention to provide an infrared landing system which indicates to the pilot of an aircraft the proper glide path, heading, altitude, and distance to touchdown.

It is still another object of this invention to provide an infrared landing system which indicates errors in aircraft aim, altitude, lateral position, in continuous and simultaneous display.

Other objects of the invention will become apparent from the following descripiton taken in connection with the accompanying drawings, in which Fig. 1 illustrates a landing field and ten beacons;

Fig. 2 is a plan view of the coverage by each beacon;

Figs. 3, 4, 5, 6, 7, 8, 9, 10, and 11 are various pictorial displays of the beacons, indicating to the pilot necessary corrections of the flight path;

Figure 1:
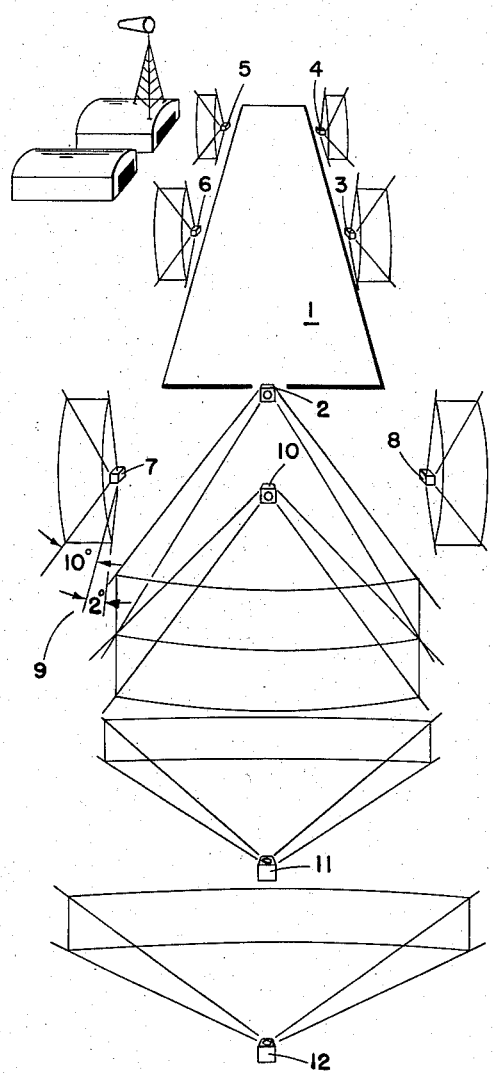

Referring now to Fig. 1, an airstrip 1 is delineated by beacons 3, 4, 5, and 6. Beacons 7 and 8 are disposed off the near end of the runway. Each of these beacons is indicated as radiating in vertical sectors having an elevation coverage to sixty degrees. These sectors converge. Beacon 7 indicates that each beacon has a horizontal angular coverage of ten degrees left of line 9 (away from the airstrip). Line 9 is parallel to the runway. The fields of coverage of beacons 5 and 6 are similar to that of beacon 7. The fields of coverage of beacons 3, 4, and 8 are similarly ten degrees away from strip 1 and two degrees toward strip 1. Each beacon radiates in a given sector and all sectors overlap to define a common area which is the correct approach to the runway. Beacons 2 and 10 radiate in overlapping horizontal sectors to indicate the glide path, and their respective fields of coverage are as indicated. These beacons laterally define the approach path to the runway. Beacons 11 and 12 are distance beacons and provide indications to the pilot of distance to go to touchdown.

Figure 2:
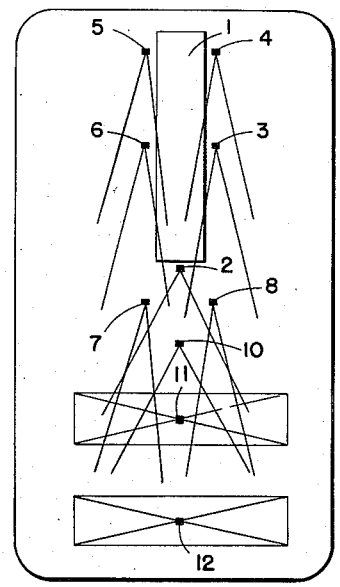

Fig. 2 is a plan view of the radiating fields of each of the beacons showing the angular coverage. Each beacon transmits in a given sector, which sectors overlap to define a correct glide path.

Figure 3:
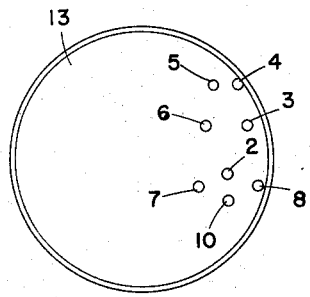
Figure 4:
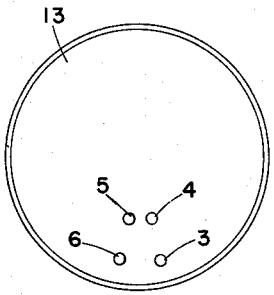
Figure 5:
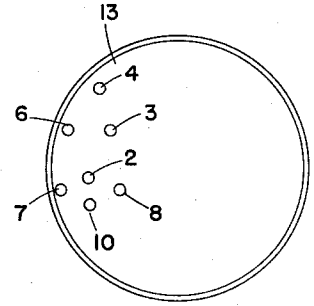
Figure 6:
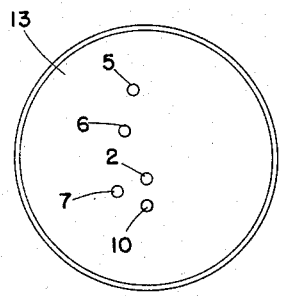
Figure 7:
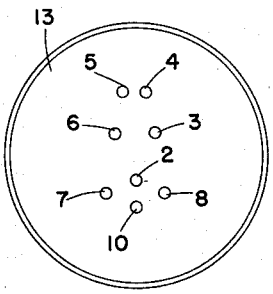
Figure 8:
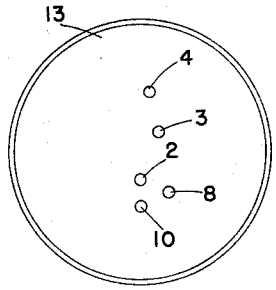
Figure 9:
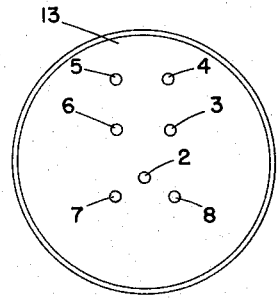
Figure 10:
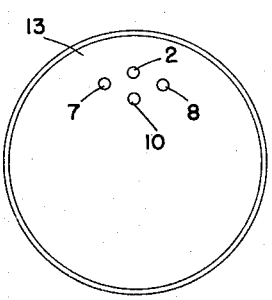
Figure 11:
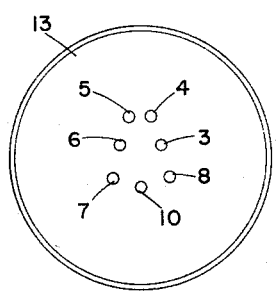

Assuming that the view is reproduced and presented visually to the pilot on an oscilloscope, the various indications for correct and incorrect landing flight path would be those indicated in Fig. 3 and following. In Fig. 3, for example, beacons 2, 3, 4, 5, 6, 7, 8 and 10 appear on the right side of the face of the oscilloscope and indicate the pilot is aiming too far to the left. Inasmuch as all beacons are visible, the lateral position and altitude are correct. Fig. 4, in which beacons 3, 4, 5, and 6 only are visible indicates that the pilot is aiming too high. Fig. 5 indicates that the pilot is aiming too far to the right. Fig. 6 indicates that the pilot is too far to the left, laterally, but aiming generally in the correct direction with respect to the field. This illustrates the reason for having the beacons visible for a greater angle away from the airport than toward the airport. One or more beacons then disappear at incorrect approach positions. Fig. 7 illustrates a correct approach. Fig. 8 illustrates flying too far to the right. Fig. 9 illustrates a position which is too high. Beacon 10 is not visible. Fig. 10 illustrates an aim which is too low. Fig. 11 illustrates a position which is too low. Beacon 2 is not visible. It will be noticed that the central location on the indicator of all or most of the beacons indicates a correct aim. The disappearance of one or more beacons indicates an incorrect altitude or lateral position. The preceding figures do not include a presentation of distance beacons 11 and 12 of Fig. 1.

Figure 12:
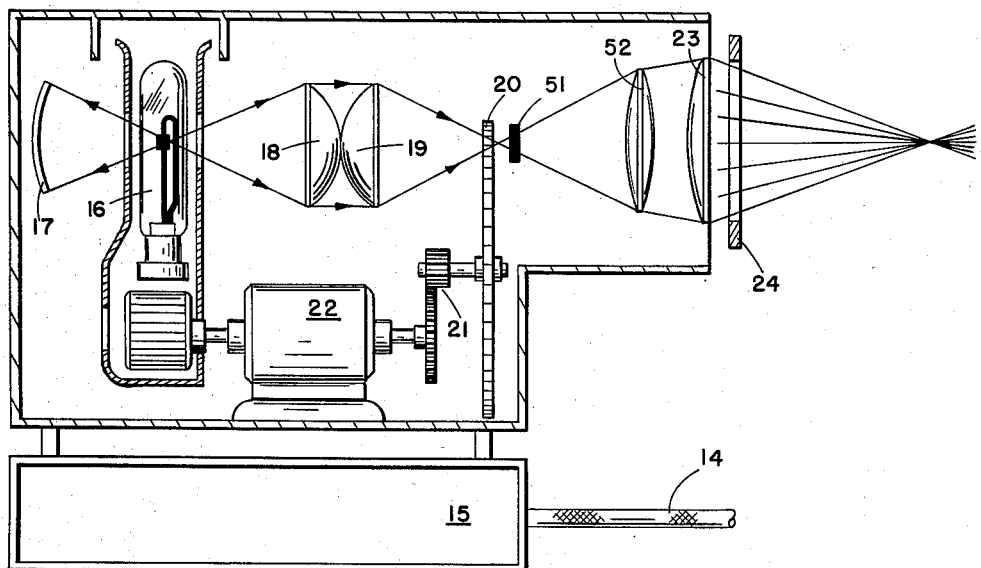
Fig. 12 is an illustration of a beacon.

Fig. 12 is a beacon and indicates a practical construction. Power is received through cable 14 at a base 15 in which may be included transformers and rectifiers for each beacon. An ordinary tungsten projection bulb provides suitable radiation and is illustrated by bulb 16, located in front of reflector 17. Infrared-transmitting lenses 18 and 19, of fused quartz, act to re-image the source in the plane of chopper disc 20 having radial slits. The light is modulated at 10,000 cycles per second by the slits of chopper disc 20 which is driven through gear train 21 by motor 22. Motor 22 also drives a blower which acts to cool the tungsten bulb 16. Reflector 17 is located immediately behind the light source and images the filaments within the lamp slightly displaced to the side, creating interlaced, inverted images between the sources. This is common practice in projector systems.

Immediately in front of the mechanical chopper disc 20 is a germanium filter 51, which is a single crystal about 0.1 inch thick having a coat of selenium to reduce surface reflection losses. This is followed by a spherical, fused-quartz objective lens 52 and a fused-quartz cylindrical lens 23. The cylindrical lens provides the dispersion of light illustrated in Figs. 1 and 2. Each of these lenses 52 and 23 are adjustable in either direction for focusing tungsten bulb 16. The peak radiation of tungsten lamp 16 is at wave lengths near 1.5 microns. In addition to cylindrical lens 23, optical stop 24 may be used to provide for shaping the beam to radiate in the desired vertical or horizontal sectors.

Figure 14:
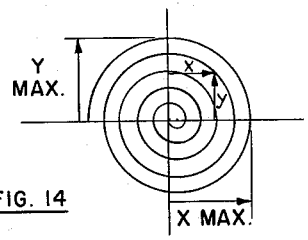
Fig. 14 illustrates the spiral scan obtained.
Figure 13:
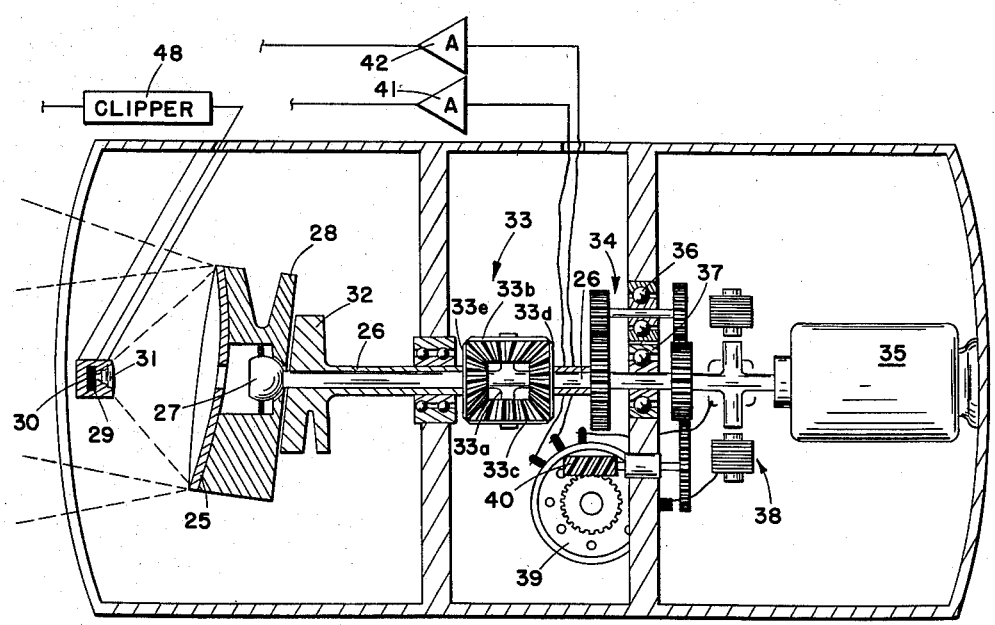
Fig. 13 is an illustration of a scanner.

An infrared receiver is located on an airplane to view the beacons illustrated in Fig. 1 and may be provided to scan a field of view of 20 degrees in diameter. Such a receiver is capable of providing angular indication down to one-half degree horizontally or vertically and is able to detect a beacon described in Fig. 12 at a distance of up to five miles, depending on the strength of the beacon and the sensitivity of the infrared-sensitive detector. Fig. 13 illustrates the infrared receiver in which a spherical collector mirror (or scanner) 25 is flexibly connected to shaft 26 through a ball mount 27 and wedge-shaped hub 28. Mirror 25 may be a paraboloid. The ball joint connection allows a nutating motion of mirror 25. Infrared-senstive cell 29, located in front of mirror 25 approximately at the focal point, is enclosed in shield 30 having an aperture 31 which is serrated to reduce reflections. Mirror 25 is adapted to nutate with respect to its rotating axis and when the mirror is spun the scanned image appears to travel in a circle at the same rate of speed. Bearings 36 and 37 mount gear train 34. A wedge-shaped cam 32 is driven through a differential 33 in the same direction at a slightly lower rate of speed than mirror 25. For example, mirror 25 rotates at twenty revolutions per second and cam 32 rotates at nineteen revolutions per second. Gear train 34 drives both the differential 33 and the shaft 26 according to motor 35. Spider 33a and spider gears 33b and 33c are rotated by shaft 26. Gear train 34 rotates the input gear 33d at a speed of one revolution per second. Output gear 33e, therefore, rotates at a speed one revolution per second slower than shaft 26, namely, nineteen revolutions per second. This provides a circular scan which decreases in size or, in effect, a spiral pattern. Although the cell element 29 remains at the focal point of collector mirror 25 the image moves across it and the pattern of scan is easier to visualize if it is considered that the cell moves across the image. Once per cycle the cell 29 scans in a spiral from the outside of circular field twenty degrees in diameter down to the center and then out again, as illustrated in Fig. 14. As shaft 26 is rotated, two-phase generator 38 is also rotated to provide a two-phase, sinusoidal, quadrature voltage which may be applied to the oscilloscope deflection plates to obtain a deflection which corresponds with the sweep of the optical scanning device. For example, one phase would provide a sinusoidal voltage of "Y max" maximum amplitude for Y deflection and the other phase would provide a sinusoidal voltage of "X max" maximum amplitude for X deflection, as illustrated in Fig. 14. Inasmuch as these amplitudes decrease as the spiral gets smaller, the outputs of the two-phase generator are first connected to two potentiometers (only potentiometer 39 is shown), which potentiometers are rotated by worm-gear 40 which is driven according to gear train 34 to provide an electrical output which decreases as the spiral decreases. That is, these potentiometers change "Y max" and "X max" to instantaneous values, to Y and X, shown in Fig. 14. The outputs of these potentiometers are then sent to deflection amplifiers 41 and 42.

Figure 15:
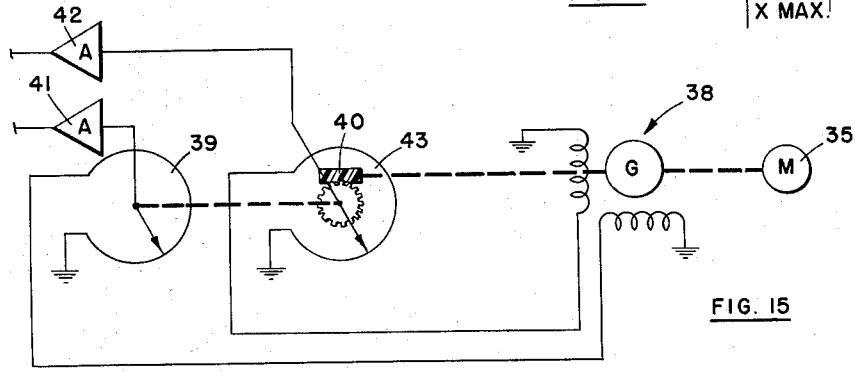
Fig. 15 is an electrical schematic of a sweep circuit which synchronizes the oscilloscope with the scanner.
Figure 16:
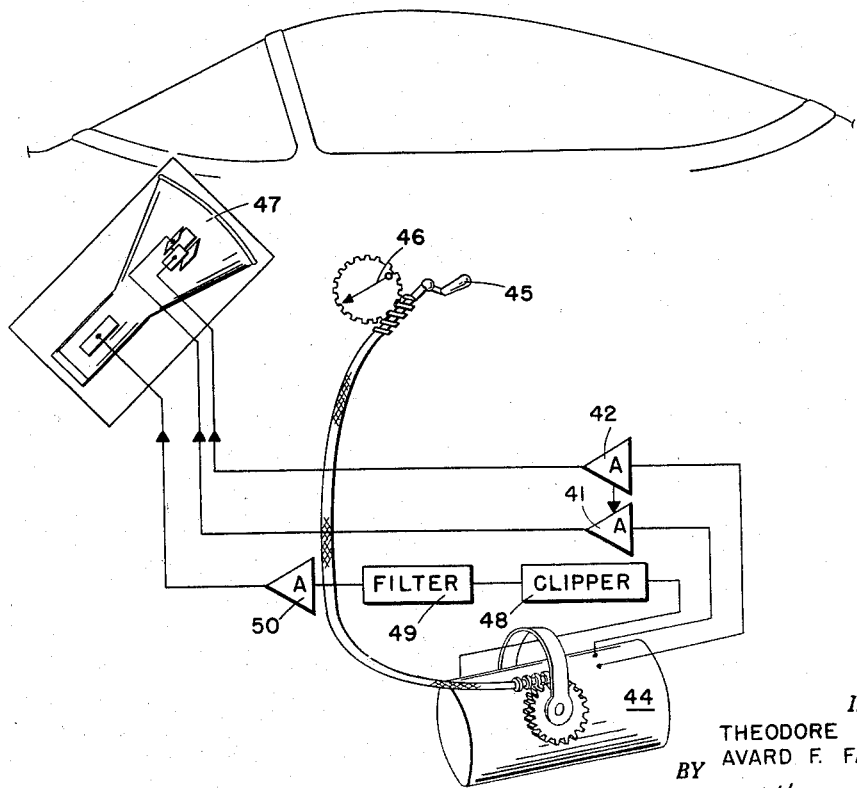
Fig. 16 is a diagram of the receiver system carried by the aircraft.

Fig. 15 further illustrates the connections of two potentiometers 39 and 43 and two-phase generator 38. The constant amplitude, sine wave output of two-phase generator 38 is thus modified by the potentiometers to provide increasing and decreasing signals according to the spiral scan which are then sent to the deflection plates of the oscilloscope, which is illustrated in Fig. 16. In Fig. 16, infrared detector 44 is indicated as being directable vertically by a control knob 45 operated by the pilot, and indicator 46 indicates to the pilot the vertical aim.

The output of the infrared cell is first sent to clipper 48 to remove all noise and weak signals below a given level. A filter 49 having a pass-band at about 10,000 cycles, which is the chopped frequency of the beacon, receives the signal from the clipper and transmits it to amplifier 50 which provides the signal to the intensity grid of the indicator to generate a pip representing each beacon as detected by the infrared cell during the scan of the mirror.

In this manner, a number of beacons located at an air port are displayed in their spatial relationship on an indicator tube for the pilot. If the aircraft is in an incorrect flight location, certain of the beacons will be visible to him or appear in given position on the oscilloscope to indicate his incorrect flight position. It will be noted that no gradations of infrared intensity are involved and the information is obtained from the location or the appearance or non-appearance of each beacon on the oscilloscope. Use of range beacons 11 and 12 may be obtained by an additional receiver, such as receiver 44 of Fig. 16. Such an additional receiver would also be connected to the intensity grid of the cathode ray tube of the oscilloscope, or a separate gun of a two-gun cathode ray tube, or in a separate indicator to indicate when the aircraft is directly over the range marker beacons.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In an infrared landing system for aircraft, a first plurality of infrared beacons radiating vertically in restricted sectors, a second plurality of infrared beacons radiating horizontally in restricted sectors, said vertically and horizontally radiating beacons overlapping to define a common area indicating a correct landing approach, an airborne infrared receiver comprising an infrared-sensitive element, a scanner in spaced relationship with said infrared sensitive element, an oscilloscope, and means for synchronizing the beam sweep of said oscilloscope with the sweep of said scanner and the intensity of said oscilloscope connected to be controlled by said infrared-sensitive element.

2. In an infrared landing system for aircraft having a landing area, a first plurality of infrared beacons positioned on said landing area to radiate vertically in restricted sectors, said sectors overlapping to define a glide path vertically, a second plurality of infrared beacons delineating said landing area and radiating horizontally in restricted sectors, said sectors overlapping to define laterally a glide path, all of said restricted sectors of said first and second plurality of infrared beacons overlapping to define a common area indicating a correct landing approach for said aircraft, and a third plurality of infrared beacons radiating in restricted sectors, said beacons radiating vertically in sectors perpendicular to said landing area to provide distance information.

3. The combination recited in claim 2 wherein is included an infrared receiver comprising an infrared-sensitive element, a scanner in spaced relationship with said infrared-sensitive element, means for providing a spiral motion of said scanner, and an oscilloscope and means for synchronizing the sweep of said oscilloscope with the sweep of said scanner, the intensity of said oscilloscope connected to be controlled by the output of the infrared-sensitive element of said receiver.

4. In an infrared landing system for an aircraft, a plurality of infrared glide path beacons radiating in horizontal overlapping sectors, the common portion of said sectors defining a glide path, a plurality of runway marker infrared radiating beacons radiating in vertical, overlapping sectors, the common portion of said vertical sectors laterally defining said glide path, all of said sectors of said beacons radiating overlapping to define a common area indicating a correct approach for said aircraft.

5. The combination recited in claim 4 wherein is included an infrared receiver comprising an infrared-sensitive element, a scanner, means for sweeping said scanner in a spiral pattern, an oscilloscope, and means for synchronizing the beam sweep of said oscilloscope with the sweep of said scanner, the intensity of said oscilloscope connected to be controlled by the output of said infrared-sensitive element.

References Cited in the file of this patent

UNITED STATES PATENTS

| | | |
|---|---|---|
| 2,130,913 | Tolson | Sept. 20, 1938 |
| 2,151,549 | Becker | Mar. 21, 1939 |
| 2,410,831 | Maybarduk | Nov. 12, 1946 |
| 2,422,971 | Kell et al. | June 24, 1947 |
| 2,526,314 | Alexanderson | Oct. 17, 1950 |

FOREIGN PATENTS

| | | |
|---|---|---|
| 579,167 | Great Britain | July 25, 1946 |